United States Patent [19]

Dickinson

[11] Patent Number: 5,366,198
[45] Date of Patent: Nov. 22, 1994

[54] VIBRATION ISOLATION MOUNT WITH LOCKING MEANS

[75] Inventor: Stuart C. Dickinson, Bristol, R.I.

[73] Assignee: The United States of America as represented by the Secretary of the Navy, Washington, D.C.

[21] Appl. No.: 37,878

[22] Filed: Mar. 29, 1993

[51] Int. Cl.⁵ .............................................. F16M 13/00
[52] U.S. Cl. ..................................... 248/550; 248/603; 248/632; 248/638; 267/136; 267/292
[58] Field of Search ............... 248/560, 603, 632, 638, 248/673, 675, 550, 614; 267/140.13, 140.14, 136, 292

[56] References Cited

U.S. PATENT DOCUMENTS

| | | | |
|---|---|---|---|
| 3,145,012 | 8/1964 | Kfoury | 248/638 X |
| 4,080,998 | 3/1978 | Mottola et al. | 248/560 X |
| 4,406,592 | 9/1983 | Kropiwnicki | 248/560 X |
| 4,919,402 | 4/1990 | Doi | 267/140.14 |
| 5,029,823 | 7/1991 | Hodgson | 267/140.14 |
| 5,209,326 | 5/1993 | Harper | 248/550 X |
| 5,238,232 | 8/1993 | Kobayashi et al. | 267/136 X |

Primary Examiner—Ramon O. Ramirez
Attorney, Agent, or Firm—Michael J. McGowan; Prithvi C. Lall; Michael R. Oglo

[57] ABSTRACT

A vibration isolation mount comprises a frame adapted for attachment to a support member, a spring device mounted on the frame and adapted for attachment to a protected device, the spring device being movable on the frame to permit movement of the protected device relative to the support member, and a locking mechanism for limiting movement of the spring device on the frame, thereby to limit movement of the protected device relative to the support member.

11 Claims, 2 Drawing Sheets

VIBRATION ISOLATION MOUNT WITH LOCKING MEANS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to vibration isolation mounts having spring means for damping vibration of a body, and is directed more particularly to such a mount having means for locking the spring means in place during transitional periods of high vibrational activity or force loading.

(2) Description of the Prior Art

Vibration isolation mounts prevent unwanted vibrational forces from propagating from a device, such as a motor, into the environment, or to protect a device from its surroundings, as in seismic instrumentation isolation. The mount design and material properties are selected to achieve the desired degree of isolation, or damping, during normal operation.

A spring means is an inherent part of a vibration isolation mount. Vibrations exert an oscillating force on the spring means which "gives". During transient high-load events, as for example, in the start up of electric motors, or launch of a vehicle, the vibration mount may be subjected to conditions beyond its design limits. The spring means, which may be a viscoelastic material, such as rubber, may rupture or distort, permitting the protected device to move beyond safe limits.

Accordingly, there is a need for a vibration isolation mount having the usual flexibility during normal periods of operation of the protected device, but having means for automatically locking the spring means so as to prevent movement of the protected device beyond safe limits during unusually active vibrational activity of the device and/or during the occurrence of transient static loads on the device.

SUMMARY OF THE INVENTION

It is therefore an object of the invention to provide a vibration isolation mount adapted to provide vibration damping of a device during normal operation of the device, and having means for automatically locking a spring means portion of the mount, such that the movement permitted of the spring means portion, and therefore the movement permitted of the protected device, is limited.

With the above and other objects in view, as will hereinafter appear, a feature of the present invention is the provision of a vibration isolation mount comprising a frame adapted for attachment to a support member, a spring means mounted on the frame and adapted for attachment to a protected device, the spring means being movable on the frame to permit movement of the protected device relative to the support member, and locking means for limiting movement of the spring means on the frame, thereby to limit movement of the protected device relative to the support member.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

DESCRIPTION OF THE PREFERRED EMBODIMENT

Figure 1:
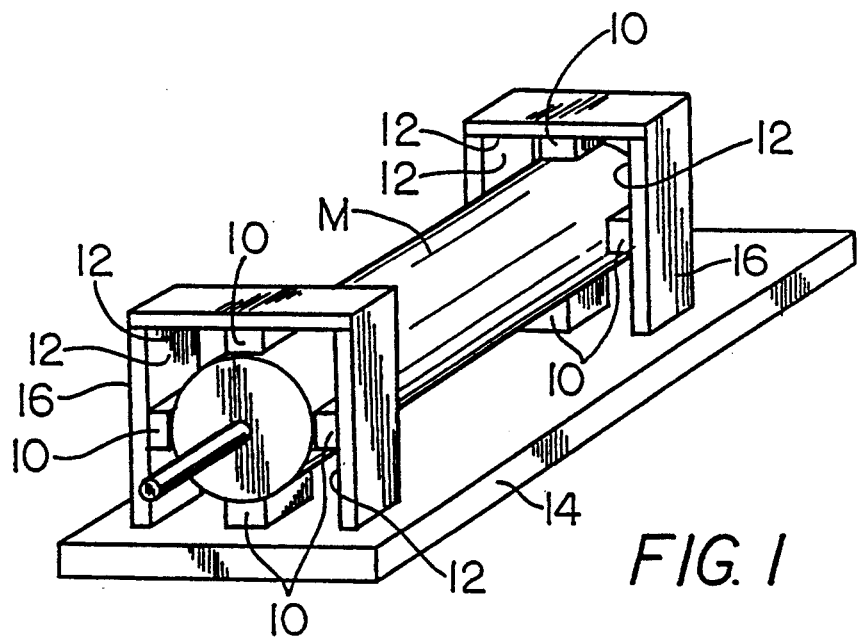
FIG. 1 is a perspective view of a protected device supported by vibration isolation mounts illustrative of an embodiment of the invention.

Referring to FIG. 1, it will be seen that a protected device M, which may be an electric motor, or the like, is supported by vibration isolation mounts 10 fixed to a base plate 14 and support members 12, which may, as illustrated, include brackets 16 upstanding from the base plate 14.

Figure 2:
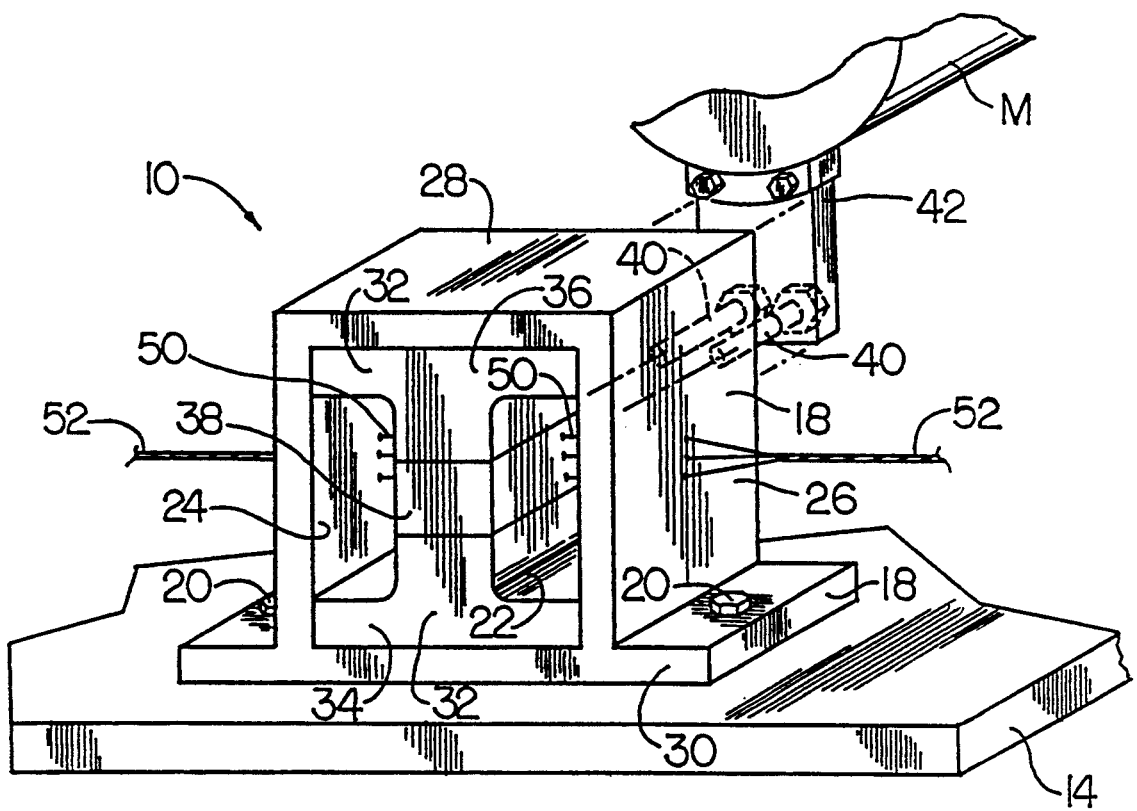
FIG. 2 is an enlarged perspective and exploded view of a single illustrative vibration isolation mount of FIG. 1.

As may be seen in FIG. 2, each of the vibration isolation mounts 10 includes a frame 18 adapted for attachment, as by bolts 20, to one of the support members 12. The frame 18 defines a compartment 22 having first and second sides 24, 26, a top plate 28, and a bottom plate 30. A spring means 32 is disposed in compartment 22 and includes a T-shaped first elastomeric member 34 bonded to side walls 24, 26 and bottom plate 30 of frame 18. The spring means 32 further includes a T-shaped second elastomeric member 36 bonded to side walls 24, 26 and top plate 28 of frame 18. Between the first and second elastomeric members, and bonded thereto, is a rigid metal block 38. The metal block 38 is connected, as by bolts 40 to a bracket 42 which is adapted for connection to the protected device M. Thus, in normal operation vibration of the device M is carried through bracket 42 and block 38 to elastomeric members 34, 36 which absorb the vibrations, such that frame 18 and base plate 14 experience substantially no vibration.

Figure 3:
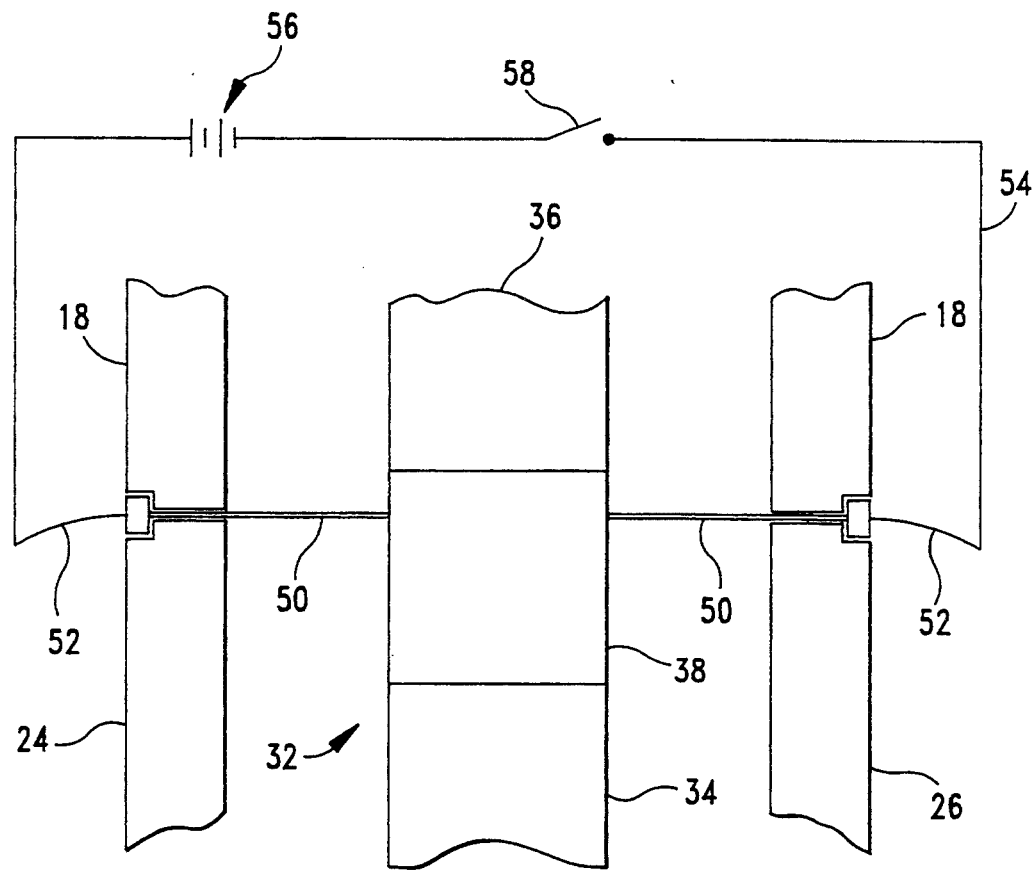
FIG. 3 is a diagrammatic illustration of a spring means portion of the vibration isolation mount of FIG. 2, the spring means portion being shown in a locked condition.
Figure 4:
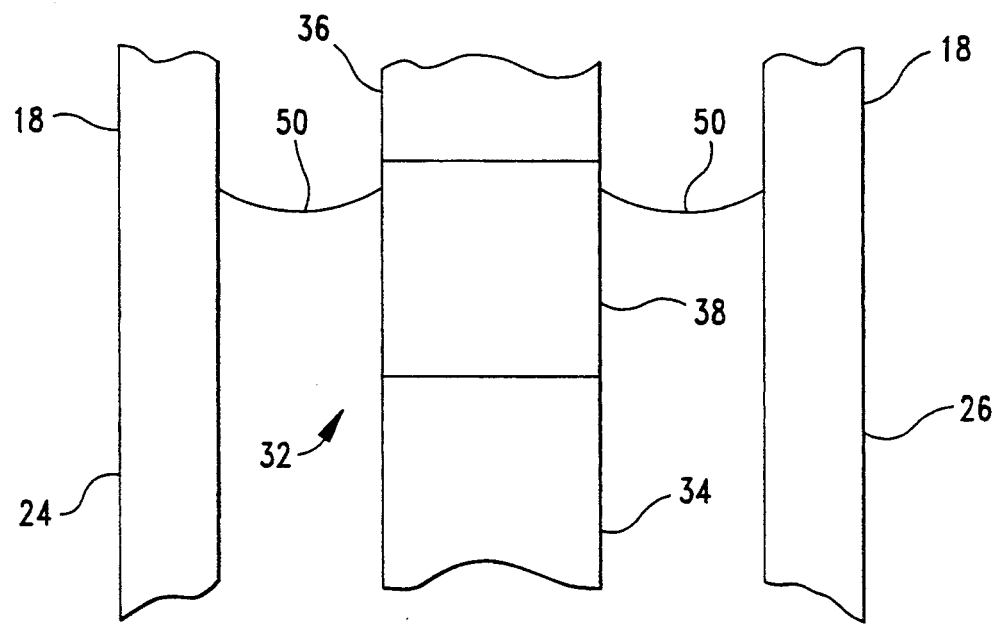
FIG. 4 is similar to FIG. 3, but shows the spring means portion in its normal operating condition.

Referring to FIGS. 2–4, it will be seen that block 38 is connected to each of the side walls 24, 26 by one or more support wires 50 of a shape memory alloy, such as nitinol, an alloy of nickel and titanium. When below a transition temperature, the nitinol support wires 50 are relaxed and easily stretched. In FIG. 4, it is diagrammatically illustrated that in the relaxed condition, support wires 50 permit sidewise movement of block 38. Vertical and axial movement is similarly permitted.

As may be seen in FIG. 3, support wires 50 are in electrical communication with electrically conductive wires 52 which are disposed in an electrical circuit 54 having therein a power source, such as a battery 56, and a switch 58. When switch 58 is closed, current from battery 56 flows through wires 52 to support wires 50. In short order, support wires 50 exceed the aforementioned transition temperature, whereupon wires 50 assume a shortened and more rigid condition, minimizing the sideways movement allowed of the block 38. Upon opening of switch 58, current ceases flowing through wires 50 and the heat in the wires 40 quickly dissipates from wires 50 and through and from metal block 38. Thus, wires 50 quickly fall to below the transition temperature, regain their relaxed configuration (FIG. 4), and permit movement of the block 38.

In operation, the switch 58 may be automatically closed by a transition event in the protected device. After a selected time, or after another event related to stabilization of the protected device, switch 58 may be automatically opened. Thus, transition events may be responded to automatically by the vibration isolation mounts described herein.

Vibration isolation mounts may be used for selected vibrational transitions in selected devices, as, for example, for starting torque in electric motors. The bracket component 42 of the mount assembly may be configured to achieve multi-axis locking or selected axis locking, as desired. Inasmuch as support wires 50 may be of relatively large diameter; the term "wire" is intended to include that which in common parlance might be deemed a "rod" or the like The automatic closing of switch 58 may be dictated by any of various known sensors, such as accelerometers, displacement transducers, pressure and/or velocity sensors, RPM sensors, or machine control signals.

It is to be understood that the present invention is by no means limited to the particular construction herein disclosed and/or shown in the drawings, but also comprises any modifications or equivalents within the scope of the claims.

What is claimed is:

1. A vibration isolation mount comprising:
   a frame adapted for attachment to a support member;
   a spring means mounted on said frame and adapted for attachment to a protected device, said spring means being movable on said frame to permit movement of said protected device relative to said support member; and
   locking means for limiting movement of said spring means on said frame, thereby to limit movement of the protected device relative to the support member, said locking means comprising support wires of a shape memory alloy material interconnecting said frame and said spring means, said support wires being in communication with an electrical power source.

2. A vibration isolation mount comprising:
   a frame adapted for attachment to a support member;
   a spring means mounted on said frame and adapted for attachment to a protected device, said spring means being movable on said frame to permit movement of said protected device relative to said support member; and
   locking means for limiting movement of said spring means on said frame, thereby to limit movement of the protected device relative to the support member, said locking means further comprising means interconnecting said frame and said spring means, said interconnecting means being adapted to assume one of two modes, said two modes comprising a relaxed mode permitting substantial movement of said spring means in said frame and a rigid mode preventing said substantial movement.

3. The mount in accordance with claim 2 wherein said interconnecting means comprises support wires of a shape memory alloy material, and said mount further includes electrically conductive wires in electrical communication with said support wires.

4. The mount in accordance with claim 3 wherein said frame includes a top plate and bottom plate interconnected by first and second side walls, and said support wires extend from said side walls to said spring means.

5. The mount in accordance with claim 4 wherein said spring means comprises a rigid block fixed to elastomeric means, said elastomeric means being fixed within said frame.

6. The mount in accordance with claim 5 wherein said block is adapted for attachment to said protected device.

7. The mount in accordance with claim 6 wherein said block has fixed thereto said support wires.

8. The mount in accordance with claim 7 wherein said elastomeric means comprises a first elastomeric member bonded to said frame and to a surface of said block, and a second elastomeric member bonded to said frame and to an opposite surface of said block, said first and second elastomeric members being adapted to permit movement of said block in said frame.

9. The mount in accordance with claim 8 wherein said movement of said block in said frame is limited by said support wires interconnecting said block and said frame, the extent of said limitation being governed by said mode in which is disposed said support wires.

10. The mount in accordance with claim 9 wherein said shape memory alloy is nitinol.

11. The mount in accordance with claim 10 including a power source and a switch in circuit with said electrically conductive wires, said switch being operable by a transient event in said protected device.

* * * * *